US008363106B2

(12) United States Patent
Martin et al.

(10) Patent No.: US 8,363,106 B2
(45) Date of Patent: Jan. 29, 2013

(54) VIDEO SURVEILLANCE METHOD AND SYSTEM BASED ON AVERAGE IMAGE VARIANCE

(75) Inventors: Lionel Martin, Peynier (FR); Tony Baudon, Rousset (FR)

(73) Assignee: STMicroelectronics SA, Montrouge (FR)

( * ) Notice: Subject to any disclaimer, the term of this patent is extended or adjusted under 35 U.S.C. 154(b) by 905 days.

(21) Appl. No.: 12/417,223

(22) Filed: Apr. 2, 2009

(65) Prior Publication Data

US 2009/0251544 A1 Oct. 8, 2009

(30) Foreign Application Priority Data

Apr. 3, 2008 (FR) ...................................... 08 01843

(51) Int. Cl.
*H04N 7/18* (2006.01)

(52) U.S. Cl. ......... 348/155; 348/143; 348/154; 348/159

(58) Field of Classification Search .................. 382/103, 382/154, 190, 195; 348/143, 154, 155, 218.1; 375/240.12, 240.16
See application file for complete search history.

(56) References Cited

U.S. PATENT DOCUMENTS

| | | | | |
|---|---|---|---|---|
| 6,052,414 | A * | 4/2000 | Lee et al. | 375/240.16 |
| 7,133,069 | B2 * | 11/2006 | Wallach et al. | 348/218.1 |
| 7,742,072 | B2 * | 6/2010 | Tagawa et al. | 348/154 |
| 2002/0104094 | A1 | 8/2002 | Alexander et al. | |
| 2002/0106127 | A1 * | 8/2002 | Kodama et al. | 382/195 |
| 2004/0080615 | A1 * | 4/2004 | Klein et al. | 348/143 |
| 2004/0086152 | A1 * | 5/2004 | Kakarala et al. | 382/103 |
| 2004/0246123 | A1 * | 12/2004 | Kawabe et al. | 340/506 |
| 2005/0057652 | A1 * | 3/2005 | Tagawa et al. | 348/154 |
| 2007/0070199 | A1 * | 3/2007 | Kung | 348/155 |
| 2007/0133865 | A1 * | 6/2007 | Lee et al. | 382/154 |
| 2008/0166050 | A1 * | 7/2008 | Yeh et al. | 382/190 |
| 2008/0181459 | A1 * | 7/2008 | Martin et al. | 382/103 |
| 2009/0123074 | A1 * | 5/2009 | Chen et al. | 382/190 |
| 2010/0208811 | A1 * | 8/2010 | Murakami et al. | 375/240.12 |
| 2010/0208813 | A1 * | 8/2010 | Murakami et al. | 375/240.12 |

FOREIGN PATENT DOCUMENTS

| | | | |
|---|---|---|---|
| CN | 442768 | * | 6/2001 |
| DE | 19603766 | A1 | 8/1997 |
| GB | 2423661 | A | 8/2006 |

* cited by examiner

*Primary Examiner* — Glenton B Burgess
*Assistant Examiner* — Michael Martinez
(74) *Attorney, Agent, or Firm* — Seed IP Law Group PLLC

(57) ABSTRACT

The present disclosure relates to a video surveillance method comprising steps of a video camera periodically capturing an image of a zone to be monitored, analyzing the image to detect a presence therein, and of the video camera transmitting the image only if a presence has been detected in the image.

24 Claims, 5 Drawing Sheets

VIDEO SURVEILLANCE METHOD AND SYSTEM BASED ON AVERAGE IMAGE VARIANCE

BACKGROUND

1. Technical Field

The present disclosure relates to a video surveillance method and system. The present disclosure applies in particular to the detection of presence or intrusion.

2. Description of the Related Art

Video surveillance systems generally comprise one or more video cameras linked to one or more screens. The screens need to be monitored by one or more human operators. The number of video cameras can be greater than the number of screens. In this case, the images of a video camera to be displayed on a screen must be selected either manually or periodically.

These systems require the constant attention of the operator who must continuously watch the screens so as to be able to detect any presence or intrusion. The result is that intrusions can escape the operators' attention.

Image processing systems also exist which enable the images supplied by one or more video cameras to be analyzed in real time to detect an intrusion. Such systems require powerful and costly computing means so that the image can be analyzed in real time with sufficient reliability.

It is desirable to reduce the operators' attention that is required to detect a presence or intrusion on video images. It is also desirable to limit the number of human operators needed when images supplied by several video cameras are to be monitored. It is further desirable to limit the computing means necessary to analyze video images in real time.

BRIEF SUMMARY

In one embodiment, a video surveillance method comprises steps of a video camera periodically capturing an image of a zone to be monitored, and of transmitting the image. According to one embodiment, the method comprises a step of analyzing the image to detect any presence therein, the image only being transmitted if a presence has been detected in it.

According to one embodiment, the image analysis comprises steps of dividing the image into image zones, of calculating an average value of all the pixels of each image zone, and of detecting a presence in each image zone according to variations in the average value of the image zone.

According to one embodiment, a presence is detected in an image if the following condition is confirmed in at least one image zone of the image:

$$|MR(t,i)-MRF(t-1,i)|\geqq G(i)\cdot VRF(t-1,i)$$

in which MR(t,i) is the average value of the pixels of the image zone i in the image t, MRF(t−1,i) is an average value of the pixels of the image zone i calculated on several previous images from the previous image t−1, G(i) is a detection threshold value defined for the image zone i and VRF(t−1,i) is an average variance value calculated on several previous images from the previous image t−1.

According to one embodiment, the method comprises a step of adjusting the detection threshold of each image zone.

According to one embodiment, the detection threshold in at least one image zone is chosen so as to inhibit the detection of presence in the image zone.

According to one embodiment, the average value of an image zone comprises three components calculated from three components of the value of each pixel of the image zone.

According to one embodiment, the average value of an image zone is calculated by combining three components of the value of each pixel of the image zone.

According to one embodiment, the method comprises a step of inhibiting the detection of presence in certain image zones.

According to one embodiment, the method comprises a step of transmitting a number of image zones in which a presence has been detected in an image.

According to one embodiment, the method comprises steps of several video cameras periodically capturing images of several zones to be monitored, of each video camera analyzing the images that it has captured to detect a presence therein, and of selecting the images to be transmitted coming from a video camera, depending on the detection of a presence.

According to one embodiment, the images are analyzed by dividing each image into image zones, and by analyzing each image zone to detect a presence therein, the images to be transmitted coming from a video camera being selected according to the number of image zones in which a presence has been detected in an image by the video camera.

According to one embodiment, a video surveillance device is provided that is configured for periodically capturing an image of a zone to be monitored, and transmitting the image. According to one embodiment, the device is configured for analyzing the image to detect a presence therein, and transmitting the image only if a presence has been detected in the image.

According to one embodiment, the device is configured for dividing the image into image zones, calculating an average value of all the pixels of each image zone, and detecting a presence according to variations in the average value of each image zone.

According to one embodiment, a presence is detected in an image if the following condition is confirmed in at least one image zone of the image:

$$|MR(t,i)-MRF(t-1,i)|\geqq G(i)\cdot VRF(t-1,i)$$

in which MR(t,i) is the average value of the pixels of the image zone i in the image t, MRF(t−1,i) is an average value of the pixels of the image zone i calculated on several previous images from the previous image t−1, G(i) is a threshold value defined for the image zone i and VRF(t−1,i) is an average variance value calculated on several previous images from the previous image t−1.

According to one embodiment, the device is configured for receiving a detection threshold value for each image zone.

According to one embodiment, the device is configured for receiving an inhibition parameter for inhibiting the detection of presence in certain image zones.

According to one embodiment, the device is configured for calculating an average value MR of an image zone comprising three components calculated from three components of the value of each pixel of the image zone.

According to one embodiment, the device is configured for calculating an average value of an image zone combining three components of the value of each pixel of the image zone.

According to one embodiment, the device is configured for transmitting a number of image zones in which a presence has been detected in an image.

According to one embodiment, the device comprises a video camera configured for capturing images, analyzing the images captured to detect a presence therein, and transmitting the images only if a presence has been detected.

According to one embodiment, the device comprises several video cameras capturing images of several zones to be monitored, each video camera being configured for analyzing the images it has captured to detect a presence therein, the device being configured for selecting images to be transmitted coming from a video camera, according to the detection of a presence.

According to one embodiment, the device is configured for transmitting the images of one of the video cameras having detected a presence in the largest number of image zones of an image, when several video cameras have detected a presence in an image zone of an image.

BRIEF DESCRIPTION OF THE SEVERAL VIEWS OF THE DRAWINGS

Examples of embodiments will be described below in relation with, but not limited to, the following figures, in which.

DETAILED DESCRIPTION

Figure 1:
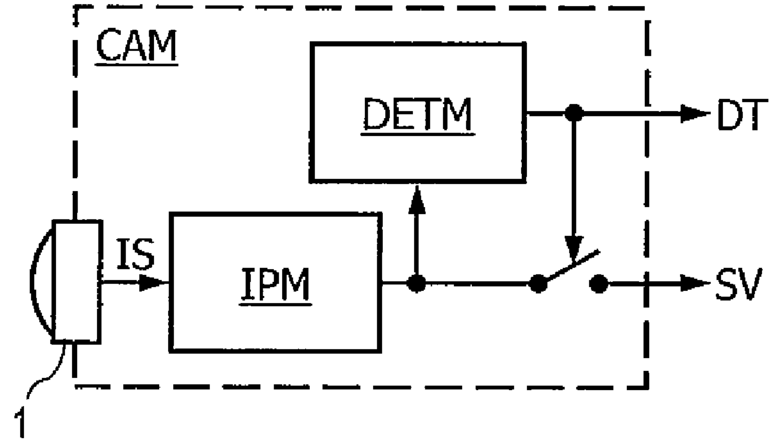
FIG. 1 represents in block form a presence detection system, according to one embodiment.

FIG. 1 represents a presence detection system comprising a video camera module CAM. The module CAM comprises a digital image sensor 1, an image processing module IPM and a detection module DETM. The sensor 1 supplies the module IPM with image signals. Using the image signals, the module IPM produces a flow of video frames or digital images SV. The module DETM analyzes the images SV supplied by the module IPM and generates a detection signal DT indicating whether or not any presence has been detected in the images SV. The signal DT controls the transmission of the flow of images SV at output of the module CAM. The image sensor 1 can be of CMOS type.

Figure 2:
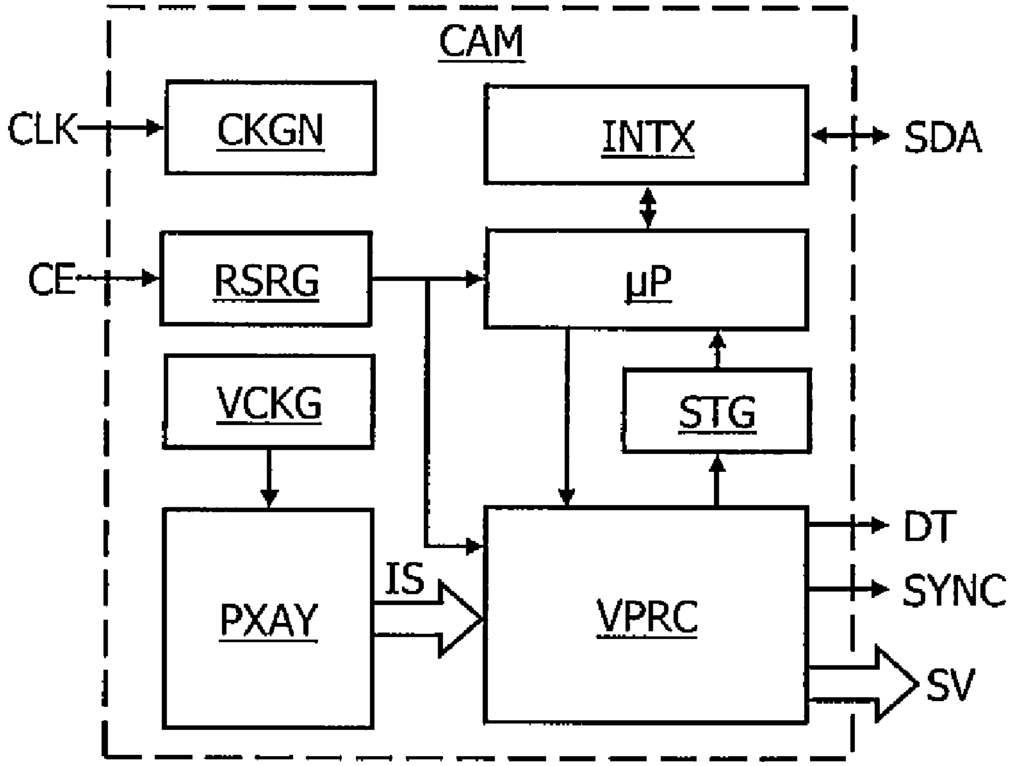
FIG. 2 represents in block form the hardware architecture of a video camera module, according to one embodiment.

FIG. 2 represents one embodiment of the video camera module CAM which can be produced as a single integrated circuit. In FIG. 2, the module CAM comprises the sensitive surface PXAY of the image sensor 1, a clock signal generator CKGN, an interface circuit INTX, a microprocessor μP, a video processing circuit VPRC, a video synchronization circuit VCKG, a reset circuit RSRG, and an image statistic calculation circuit STG.

The circuit VPRC receives image pixels IS from the sensor 1 and applies different processing operations to them to obtain corrected images. The circuit CKGN generates the clock signals required for the operation of the different circuits of the module CAM. The circuit VCKG generates the synchronization signals SYNC required to operate the circuit VPRC. The microprocessor μP receives commands through the interface circuit INTX and configures the circuit VPRC according to the commands received. The microprocessor can also perform a part of the processing operations applied to the images. The circuit STG performs calculations on the pixels of the images, such as calculations of the average of the pixel values of each image. The circuit RSRG activates or deactivates the microprocessor μP and the circuit VPRC according to an activation signal CE. The interface circuit INTX is configured for receiving different operating parameters from the microprocessor μP and from the circuit VPRC and for supplying information such as the result of the presence detection. The circuit INTX is of the I2C type for example.

The circuit VPRC applies to the pixels supplied by the sensor 1 particularly color processing, white balance adjustment, contour extracting, and opening and gamma correcting operations. The circuit VPRC supplies different synchronization signals FSO, VSYNC, HSYNC, PCLK enabling images to be displayed on a video screen. According to one embodiment, the detection operations of the module DETM are performed at least partially by the circuit VPRC and, if any, by the microprocessor. The circuit VPRC is for example produced in hard-wired logic.

Figure 3:
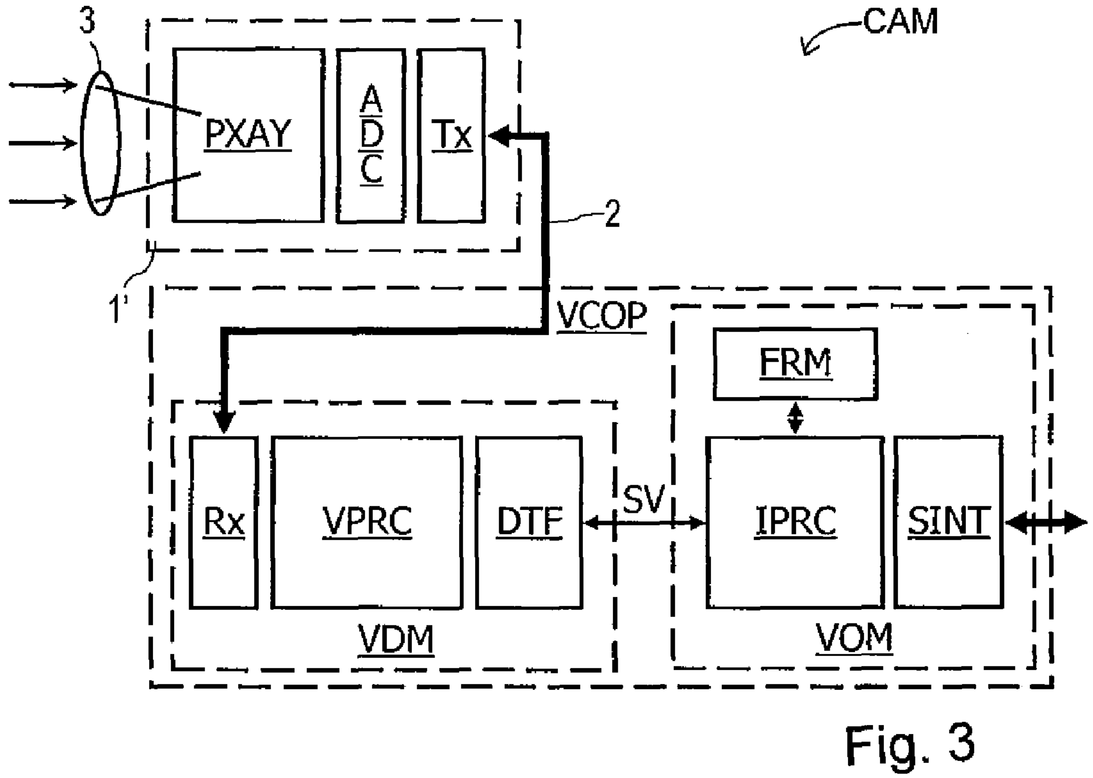
FIG. 3 represents in block form the hardware architecture of a video camera module, according to another embodiment.

FIG. 3 represents another embodiment of the video camera module CAM. In FIG. 3, the video camera module is produced in two main blocks, comprising an image sensor 1', and a video coprocessor VCOP linked to the image sensor by a transmission link 2. The image sensor comprises a sensitive surface PXAY coupled to a video camera lens 3, an analog-to-digital conversion circuit ADC, and a digital transmission circuit Tx to transmit the signals of digitalized pixels at output of the circuit ADC via the link 2.

The video coprocessor VCOP comprises a video processing module VDM connected to the link 2 and a video output module VOM. The module VDM comprises a receive circuit Rx connected to the link 2, a video processing circuit VPRC such as the one represented in FIG. 2, and a formatting circuit DTF for formatting the video data produced by the video processor. The circuit DTF applies to the images, at output of the circuit VPRC, image format conversion operations, for example to convert YUV-format images into RGB format.

The module VOM comprises an image processing circuit IPRC connected to a frame memory FRM provided to store an image, and an interface circuit SINT. The circuit IPRC is configured particularly for applying to the sequences of images SV at output of the formatting circuit DTF, video format conversion operations including image compression operations, for example to convert the images into JPEG or MPEG format. The circuit SINT applies to the video data, at output of the circuit IPRC, adaptation operations to make the output format of the video data compatible with the system to which the coprocessor VCOP is connected.

Figure 4:
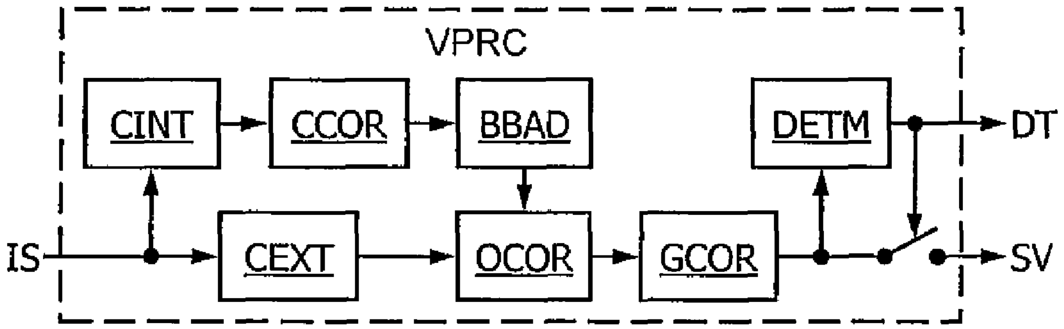
FIG. 4 represents in block form an example of functional architecture of a video processor of the video camera module, according to one embodiment.

FIG. 4 represents functions of the video processing circuit VPRC. In FIG. 4, the processing circuit VPRC comprises color interpolation CINT, color matrix correction CCOR, white balance correction BBAD, contour extraction CEXT, opening correction OCOR, and gamma correction GCOR functions, and the detection module DETM which controls the output of the images SV according to the value of the detection signal DT. The functions CEXT and CINT directly process the image signals at output of the image sensor 1. The function CCOR applies a color correction process to the image signals at output of the function CCOR. The function BBAD applies a white balance adjustment process to the output signals of the function CCOR. The function OCOR combines the image signals at output of the functions BBAD and CEXT and applies an opening correction process to these signals. The function GCOR applies a gamma correction process to the images at output of the function OCOR, and produces the image sequence SV. The module DETM receives the images at output of the function GCOR.

To reduce the current consumption of the video processing circuit VPRC, the detection module DETM can be placed, not at the end of the image processing sequence performed by the circuit VPRC, but between two intermediate processing operations. Thus, the detection module can for example be placed between the OCOR and GCOR functions.

Figure 5:
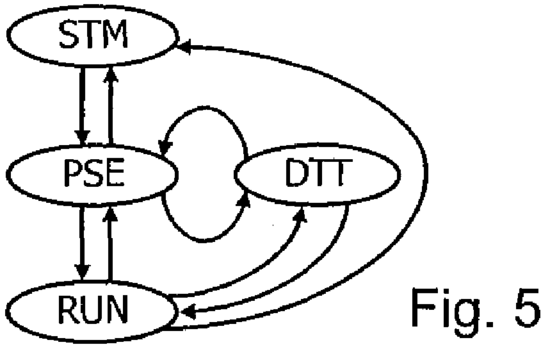
FIG. 5 is a state diagram representing operating modes of the video camera module, FIGS. 6A to 6D schematically represent images divided into image zones, according to embodiments.

In FIGS. 2 and 3, the video processing circuit VPRC has different operating modes such as those represented in the form of a state diagram in FIG. 5. In FIG. 2, the operating modes of the circuit VPRC can be controlled by the microprocessor μP according to commands received by the circuit INTX. In FIG. 5, the circuit VPRC comprises for example a low energy mode STM, a pause mode PSE, and an operational mode RUN. In the STM mode, all the circuits are switched off, except those enabling the module CAM to be configured through the circuit INTX. In the PSE mode, all the circuits and all the clock signals are active, but the circuit VPRC does not perform any processing and does not therefore supply any image. In the RUN mode, the circuit VPRC supplies images at a frequency defined by the user. When entering this state, the module CAM checks that the white balance is stabilized. Generally, one to three images are necessary to adjust the white balance.

According to one embodiment, the module CAM also comprises a detection mode DTT wherein all the circuits are active, and the circuit VPRC analyzes the images to detect a presence therein, but does not supply any image if no presence is detected. If a presence is detected, the circuit VPRC activates a detection signal DT, and the module CAM can change back to the RUN state wherein it supplies images SV. The image acquisition frequency can be lower than in the RUN mode, so as to reduce the current consumption of the module CAM.

Thus, in the DTT mode, the module CAM only transmits images SV in the event of presence detection. The bandwidth necessary for the module CAM to transmit images to a possible remote video surveillance system is thus reduced. In addition, as no image is sent by the module CAM in the DTT mode, the energy consumed in this mode remains low.

The detection module DETM implements a detection method comprising steps of dividing each image into image zones or ROI (region of interest), and of processing the pixels of each image zone to extract presence detection information therefrom. FIGS. 6A to 6D represent examples of dividing the image into image zones. FIG. 7 represents the steps of the image zone processing method implemented by the detection module DETM.

Figure 6A:
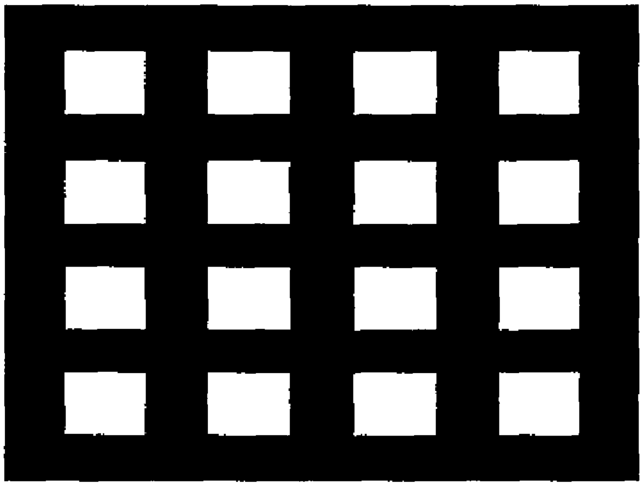
Figure 6B:
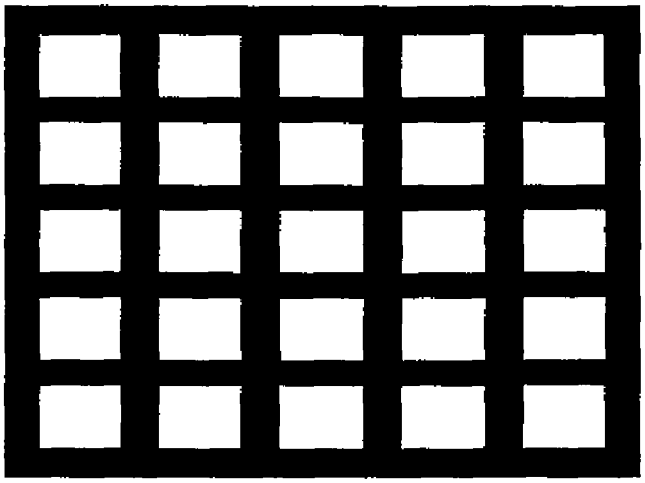
Figure 6C:
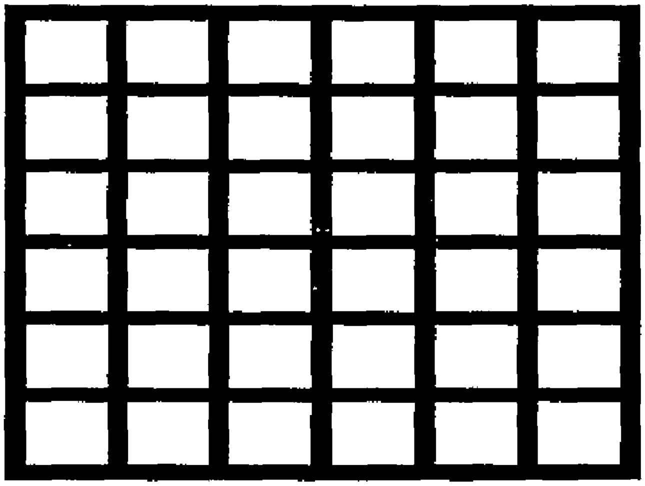
Figure 7:
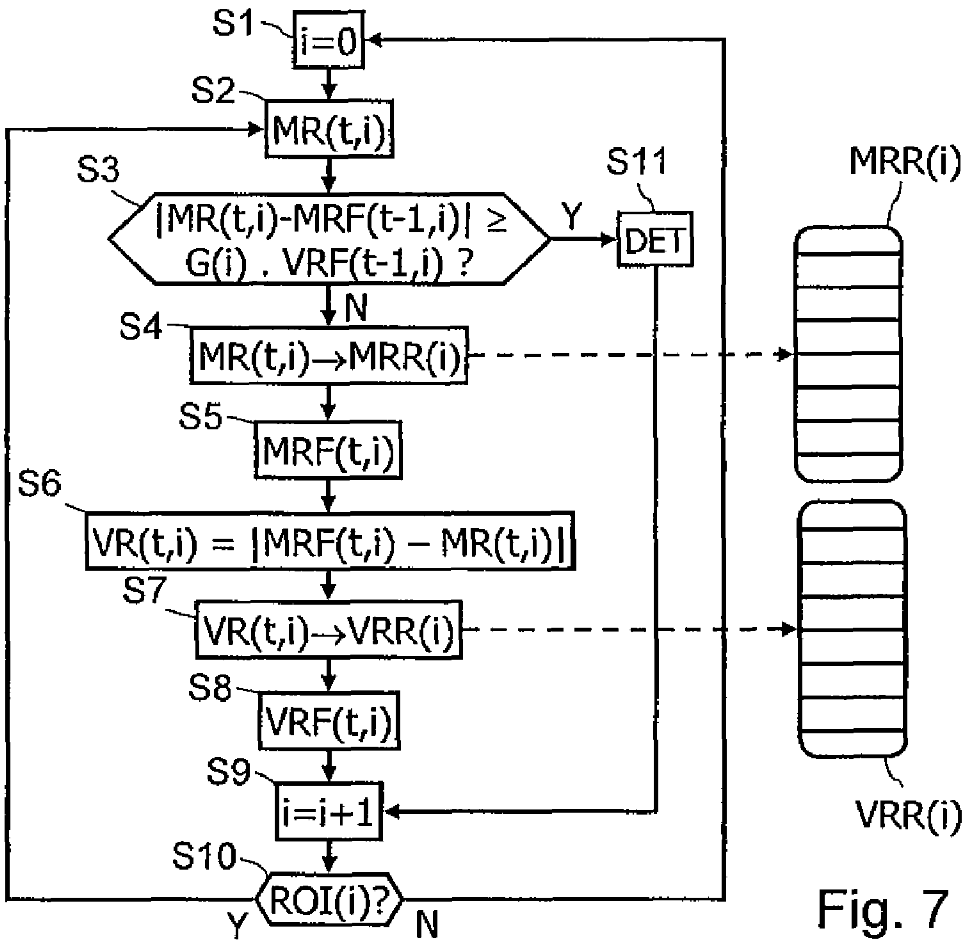
FIG. 7 is a flowchart showing the operation of the video camera module, according to one embodiment.

FIGS. 6A, 6B, 6C represent an image divided into respectively 16, 25 and 36 image zones. The number of image zones considered in an image depends on the desired level of detail or on the configuration of the zone to be monitored.

Figure 6D:
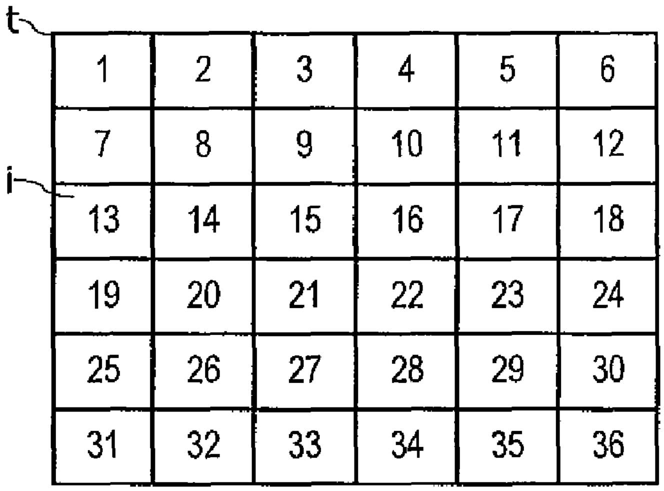

Although in FIGS. 6A to 6C, the image zones are not adjacent, it may be desirable for them to be so, as in FIG. 6D, so that all the pixels of the image are taken into account in the assessment of the detection information DT.

Furthermore, it is not necessary for the image zones to be uniformly spread out in the image, and all have the same shape and the same dimensions. Therefore, the division of the image into image zones can be adapted to the configuration of the image. For example, it can be useful to divide the image into image zones such that each image zone corresponds in the image to a substantially uniform zone of color and/or luminance and/or texture.

In FIG. 7, the method of processing the image zones comprises steps S1 to S11. For each image zone i, the method uses two registers MRR(i) and VRR(i) that are FIFO-managed (First In-First Out) to respectively store the average value and the variance of the pixels of the image zone, calculated on a set of previous images. The registers MRR(i) and VRR(i) enable a temporal filtering to be done. The sizes of the registers MRR(i) and VRR(i) are parameterable and define the number of successive images on which the temporal filtering is done.

In step S1, the module DETM sets a numbering index i for numbering the image zones. In step S2, the module DETM calculates an average value MR(t,i) of the values of the pixels of the image zone i in the image t. If the value of each pixel is defined by several components, for example Y, U, V, the average value MR(t,i) in the image zone i is calculated on the sum of the components or on a single component. In the case of a black and white imager, the considered value of each pixel can only be the luminance.

When the value of a pixel comprises several components such as Y, U, V, it can be useful to analyze each component separately. Thus, an average and luminance calculation can be done for each component for each image zone. In this case, each image zone i is associated with three registers MRR(i) and three registers VRR(i), with one register per component.

In step S3, the module DETM assesses the presence detection information on the image zone i by detecting a significant variation in the average value MR(t,i) of the image zone compared to this same image zone in several previous images. This information is for example assessed by applying the following test (1):

$$|MR(t,i)-MRF(t-1,i)|\geqq G(i)\cdot VRF(t-1,i) \quad (1)$$

wherein, MRF(t−1,i) is the average of the values stored in the register MRR(i) up to the previous image t−1, VRF(t−1,i) is the average of the values stored in the register VRR(i) up to the previous image t−1, and G(i) is a gain parameter which can be different for each image zone i.

If the test (1) is confirmed at step S3, this means that the image zone i has undergone a rapid variation in average value compared to the previous image, revealing a probable presence. The module DETM then executes step S11, then step S9, or otherwise, it executes steps S4 to S10. In step S11, the module DETM updates the presence information DT to indicate that a presence has been detected, and possibly supplies the number i of the image zone in which a presence has thus been detected.

In step S4, the module DETM stores the value MR(t,i) calculated in step S2 in the register MRR(i) by replacing the oldest value stored in the register. In step S5, the module DETM calculates and stores the average MRF(t,i) of the values stored in the register MRR(i).

In step S6, the module DETM calculates the variance VR(t, i) of the values of the pixels of the image zone i, using the following formula (2):

$$VR(t,i)=|MRF(t,i)-MR(t,i)| \quad (2)$$

In step S7, the module DETM stores the value VR(t,i) calculated in step S6 in the register VRR(i) by replacing the oldest value stored in the register. In step S8, the module DETM calculates and stores the average VRF(t,i) of the values stored in the register VRR(i).

In step S9, the module DETM increments the numbering index i of the image zones. In step S10, if the new value of the index i corresponds to an image zone of the image, the module DETM continues the processing in step S2 on the pixels of the image zone marked by the index i. If in step S10, the index i does not correspond to an image zone of the image, this means that all the image zones of the image have been processed. The module DETM then continues the processing in step S1 on the next image t+1.

It shall be noted that if the module DETM has made a detection (step S11), the registers MRR(i) and VRR(i) are not updated.

It transpires that the detection processing (steps S3 to S10) has a marginal influence on the necessary computing power, compared to the calculations of the averages MR(t,i) (step S2). As a result, the number of image zones chosen has little influence on the overall duration of the detection processing. The number of image zones has more impact on the size of the necessary memory. This number can be chosen between 16 and 49. The averages can be calculated in parallel to the detection processing, the detection method can be executed in real time, as and when images are acquired by the module CAM, without affecting the image acquisition and correction processing operations.

The module DETM can be configured through the interface circuit INTX to process only a portion of the images, for example one image in 10. In this example, the module CAM is in PSE mode for 6 to 8 consecutive images. It then changes to RUN mode during the acquisition of one to three images to enable the image to be corrected, the white balance to be adjusted and the gamma to be corrected. It then changes to DTT mode during the acquisition of an image. If a presence is detected in the DTT mode, the module CAM changes to RUN mode to supply all the images acquired, or otherwise, it returns to the PSE mode during the acquisition of the next 6 to 8 images, and so on and so forth.

According to one embodiment, the acquisition of the pixels and the calculations of averages of image zones located in the image on a same line of image zones are done in parallel to the detection calculations done on the image zones located in the image on a line of image zones previously acquired.

The detection method that has just been described proves to be relatively robust, given that it can work indifferently with images taken outdoors or indoors and that it is insensitive to slow variations such as light variations (depending on the time) or weather conditions, or to rapid changes but which only affect a non-significant portion of the image such as the movement of a tree branch tossed by the wind. The only constraint is that the field of the video camera remains fixed in the DTT mode. Furthermore, it shall be noted that the detection method can be insensitive to a rapid change in the light intensity of the scene observed by the video camera, if the white balance is adjusted before analyzing the image.

The detection method also proves to be flexible thanks to the detection threshold defined by the gain G that can be parameterized for each image zone. Therefore, it is possible to inhibit the detection in certain image zones that correspond for example to a zone which must not be monitored or which might generate false alarms. The implementation of the method does not require any significant computing means. Therefore, they remain within reach of the image processing circuits of a video camera.

Figure 8:
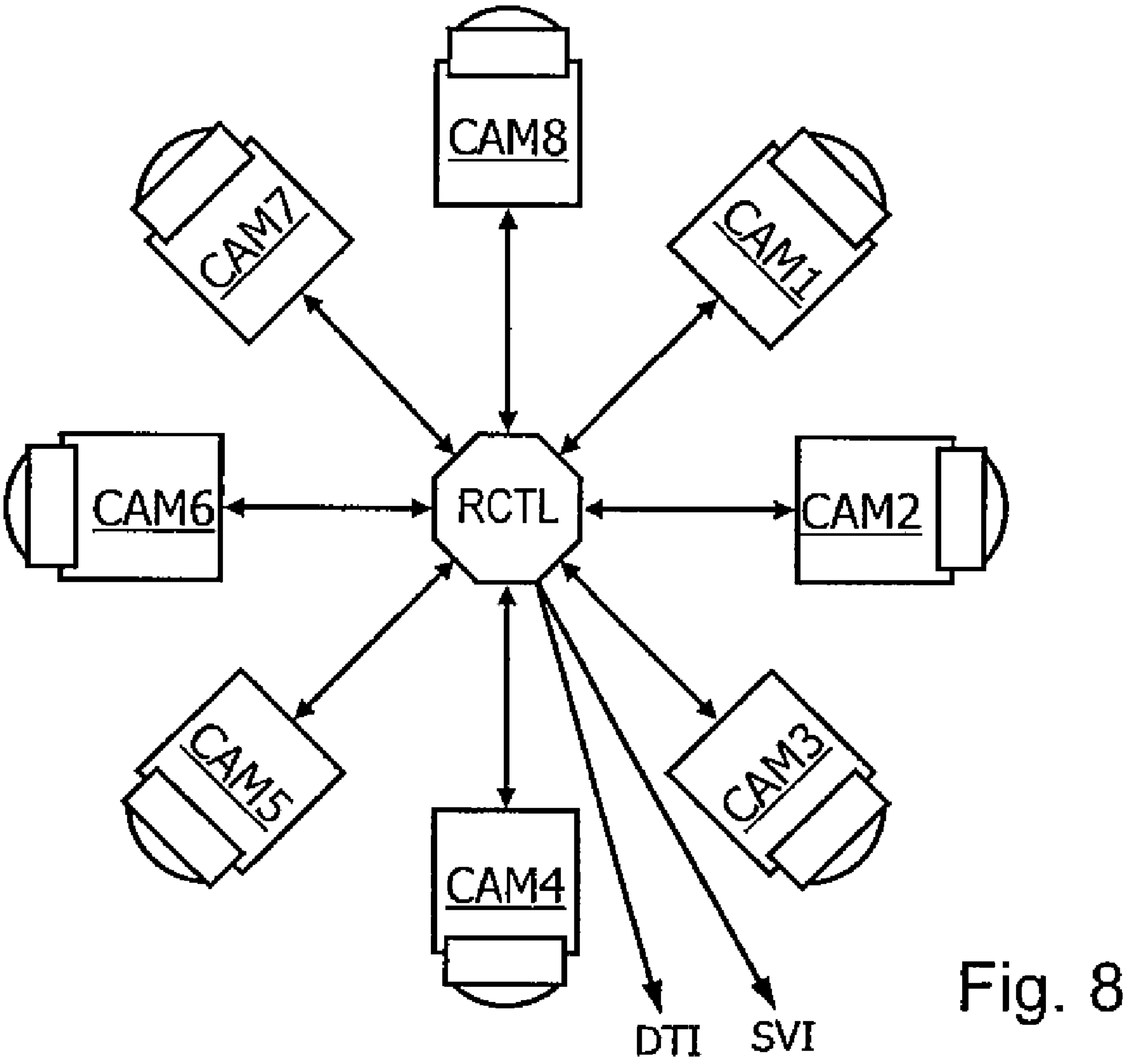
FIG. 8 represents in block form one embodiment of a video surveillance system.

FIG. 8 represents one embodiment of a video surveillance system. In FIG. 8, the system comprises several video camera modules CAM1-CAM8 of the same type as the module CAM described previously. The video camera modules CAM1-CAM8 are connected to a remote control module RCTL which controls the video camera modules CAM1-CAM8 and which receives and retransmits the detection signals DT and the video flow SV sent thereby.

The module RCTL may comprise the same states of operation as those represented in FIG. 5. In the RUNM state, the operator can select the video camera module(s) the images of which he/she wishes to observe. In the DTT state, in the event that a presence is detected by one or more video camera modules, the module RCTL sends a signal DTI associated with the numbers of the video camera modules having sent the signal DT. The module RCTL can also access the interfaces of the modules CAM1-CAM8 having sent a detection signal DT to obtain the numbers of the image zones in which the detection has been made. If a single video camera module sent the signal DT, the module RCTL retransmits, for display and/or recording, the images supplied by the video camera module having sent the signal DT. If several video camera modules sent the signal DT, the module RCTL can apply a selection logic to select the images of one of the video camera modules to be retransmitted. The selection logic can for example select the video camera module having made a detection in the largest number of image zones.

The video camera modules CAM1-CAM8 can be installed in a dome enabling a 360° panoramic surveillance to be performed.

It will be understood by those skilled in the art that various alternative embodiments and applications of the present invention are possible, while remaining within the framework defined by the enclosed claims. In particular, other presence detection algorithms can be considered, provided that such algorithms are sufficiently simple to implement in the image processing circuits of a video camera. Thus, the analysis of images per image zone is not necessary and can be replaced by a pixel-by-pixel analysis, to detect rapid variations, a presence being detected if the pixels having undergone a significant variation are close enough to each other and sufficient in number.

Furthermore, tests alternative to the test (1) can be considered to detect a significant variation in the pixel or image zone. Thus, for example, the average value of each image zone of the image being processed can simply be compared with the average value of the image zone calculated on several previous images.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A video surveillance method, comprising:

under control of a video camera module, capturing a subject image of a zone being monitored;

analyzing the subject image to detect an occurrence of a variation in the subject image compared to a previously captured image; and outputting the subject image if the occurrence of the variation has been detected in the subject image, wherein:

analyzing the subject image includes dividing the subject image into image zones; and the occurrence of a variation in the subject image compared to the previously captured image is detected if a condition is confirmed in at least one image zone of the subject image, the condition being:

$$|MR(t,i)-MRF(t-1,i)|\geqq G(i)\cdot VRF(t-1,i),$$

in which MR(t,i) is the average value of pixels of the image zone i in the subject image t, MRF(t−1,i) is an average value of pixels of the image zone i calculated on several previous images from a previous image t−1, G(i) is a detection threshold value defined for the image zone i and VRF(t−1,i) is an average variance value calculated on several previous images from the previous image t−1.

2. A method according to claim 1, wherein the analyzing the subject image further comprises:

calculating an average value of all pixels of each image zone; and detecting an occurrence of a variation in each image zone compared to a corresponding image zone in the previously capture image according to variations in the average value of each image zone.

3. A method according to claim 2, further comprising adjusting the detection threshold value of each image zone.

4. A method according to claim 3, wherein the detection threshold value in at least one image zone is chosen so as to inhibit the detecting an occurrence of a variation in the image zone.

5. A method according to claim 2, wherein, for each image zone, the average value of the image zone comprises three components calculated from three components of each pixel of the image zone.

6. A method according to claim 2, wherein, for each image zone, the average value of the image zone is calculated by combining three components of each pixel of the image zone.

7. A method according to claim 2, further comprising, inhibiting the detecting an occurrence of a variation in certain image zones.

8. A method according to claim 2, further comprising, transmitting a number of image zones in which an occurrence of a variation has been detected in the subject image.

9. A method according to claim 1, further comprising:

for each of several video cameras, capturing a respective subject image of a respective zone being monitored; and analyzing the respective subject image to detect an occurrence of a variation in the respective subject image compared to a previously captured image; and selecting the respective subject image to be outputted from a respective one of the several video cameras that captured the respective subject image, depending on the analyzing having detected the occurrence in the respective subject image.

10. A method according to claim 9, wherein the analyzing the respective subject image includes dividing the respective subject image into image zones, and analyzing each image zone to detect a variation therein, the selecting the respective subject image to be outputted including selecting the respective subject image based at least in part on a number of image zones in which a variation has been detected in the respective subject image.

11. A video surveillance device, comprising:

an image sensor configured to capture a subject image of a zone being monitored; and a detector coupled to the image sensor and configured analyze the subject image to detect an occurrence of a variation in the subject image compared to a previously captured image, and output the subject image if the occurrence of the variation has been detected in the subject image, wherein the detector is further configured to:

divide the subject image into image zones; and detect an occurrence of a variation in the subject image if a condition is confirmed in at least one image zone of the subject image, the condition being:

$$|MR(t,i)-MRF(t-1,i)|\geqq G(i)\cdot VRF(t-1,i),$$

in which MR(t,i) is the average value of pixels of the image zone i in the subject image t, MRF(t−1,i) is an average value of pixels of the image zone i calculated on several previous images from a previous image t−1, G(i) is a threshold value defined for the image zone i and VRF(t−1,i) is an average variance value calculated on several previous images from the previous image t−1.

12. A device according to claim 11, wherein the detector further configured to calculate an average value pixels of each image zone and detect an occurrence of a variation according to variations in the average value of each image zone.

13. A device according to claim 12, wherein the detector is further configured to receive the threshold value for each image zone.

14. A device according to claim 12, wherein the detector is further configured to receive an inhibition parameter for inhibiting the detection of variation in certain image zones.

15. A device according to claim 12, wherein the detector is further configured, for each image zone, to calculate the average value MR(t,i) of the image zone using three components calculated from three components of each pixel of the image zone.

16. A device according to claim 12, wherein the detector is further configured, for each image zone, to calculate an average value of the image zone combining three components of each pixel of the image zone.

17. A device according to claim 12, the detector further configured to transmit a number of image zones in which an occurrence of a variation has been detected in the subject image.

18. A device according to claim 11, wherein the device is a video camera.

19. A device according to claim 11, comprising:

plural video cameras, each of the plural video cameras configured to capture a respective subject image of a respective zone being monitored by the video camera, analyze the respective subject image to detect an occurrence of a variation in the respective subject image compared to an image previously captured by the video camera, and a controller coupled to the video cameras and configured to select the respective subject image to be transmitted coming from a respective one of the plural video cameras that captured the respective subject image based on the occurrence of the variation in the respective subject image.

20. A device according to claim 19, wherein the controller is further configured to transmit the respective subject image of the respective one of the several video cameras based on detecting an occurrence of a variation in a largest number of image zones of the respective subject image, when each of multiple of the several video cameras have detected an occurrence of a variation in an image zone of an respective subject image.

21. A video surveillance system, comprising:

one or more video camera modules, each video camera module configured to capture a subject image of a zone being monitored by the video camera, analyze the subject image to detect an occurrence of a variation in the subject image compared to a previously captured image, and transmit the subject image if the occurrence has been detected in the subject image; and a controller configured to select the subject image to be transmitted from a respective one of the one or more video cameras that captured the subject image, according to the occurrence of the variation in the subject image, wherein the video camera module is further configured to:

divide the subject image into image zones; and detect an occurrence of a variation in the subject image if a condition is confirmed in at least one image zone of the subject image, the condition being:

$$|MR(t,i)-MRF(t-1,i)| \geqq G(i) \cdot VRF(t-1,i),$$

in which MR(t,i) is the average value of pixels of the image zone i in the subject image t, MRF(t−1,i) is an average value of pixels of the image zone i calculated on several previous images from a previous image t−1, G(i) is a threshold value defined for the image zone i and VRF(t−1,i) is an average variance value calculated on several previous images from the previous image t−1.

22. The video surveillance system of claim 21, wherein the video camera module is further configured to calculate an average value of all pixels of each image zone and detect an occurrence of a variation in the subject image based on variations in the average value of each image zone.

23. The video surveillance system of claim 21, wherein the video camera module is further configured to transmit a number of image zones in which an occurrence of a variation has been detected in the subject image.

24. The video surveillance system of claim 21, wherein the one or more video camera modules is comprised of several video camera modules, and wherein the controller is further configured, when multiple of the several video cameras each detect a variation in a respective subject image, to transmit the respective subject image that includes a largest number of images zones in which an occurrence of a variation has been detected.

* * * * *